US005824395A

United States Patent [19]

Zemel

[11] Patent Number: 5,824,395

[45] Date of Patent: Oct. 20, 1998

[54] METHOD OF TRANSFERRING A GRAPHIC IMAGE FROM A TRANSFER HAVING A PAPER BACKING, A RELEASE LAYER, AND A DISCONTINUOUS LAYER

[76] Inventor: Richard S. Zemel, 1236 Harvey Rd., Knoxville, Tenn. 37922

[21] Appl. No.: 880,300

[22] Filed: Jun. 23, 1997

Related U.S. Application Data

[63] Continuation of Ser. No. 406,549, Mar. 20, 1995, abandoned.

[51] Int. Cl.[6] .......... B32B 3/00

[52] U.S. Cl. .......... 428/195; 428/79; 428/409; 427/152; 156/230; 156/235; 156/237; 156/239; 156/240; 156/247; 156/249

[58] Field of Search .......... 156/230, 232, 156/235, 237, 238, 239, 240, 241, 247, 234, 249; 427/152; 428/79, 409, 195

[56] References Cited

U.S. PATENT DOCUMENTS

| | | | |
|---|---|---|---|
| 3,660,196 | 5/1972 | Keeling et al. | 156/235 |
| 4,028,474 | 6/1977 | Martin | 428/40 |
| 4,365,549 | 12/1982 | Fotland et al. | 101/1 |
| 4,374,691 | 2/1983 | Van Bergh | 156/235 |
| 4,409,604 | 10/1983 | Fotland et al. | 346/159 |
| 4,529,654 | 7/1985 | Drum | 428/340 |
| 4,983,446 | 1/1991 | Taniguchi et al. | 428/216 |
| 5,068,742 | 11/1991 | Oshikoshi et al. | 358/296 |
| 5,106,719 | 4/1992 | Oshikoshi et al. | 430/203 |
| 5,489,359 | 2/1996 | Yamane | 156/540 |

*Primary Examiner*—Merrick Dixon

*Attorney, Agent, or Firm*—Sofer & Haroun, LLP.

[57] ABSTRACT

A borderless decorative graphic transfer and its application which is applied to a gum and starch coated absorbent paper is disclosed. The printed image may be applied by non-soluble water, non-soluble ink or laser printer copy toner. After printing on the coated paper, an acrylic dusting is applied to the exterior. The overlay creates a non-continuous film graphic transfer with an invisible coating. Thereafter, the image can be transferred by heat, chemical, or contact adhesive.

13 Claims, 1 Drawing Sheet

Figure 1:
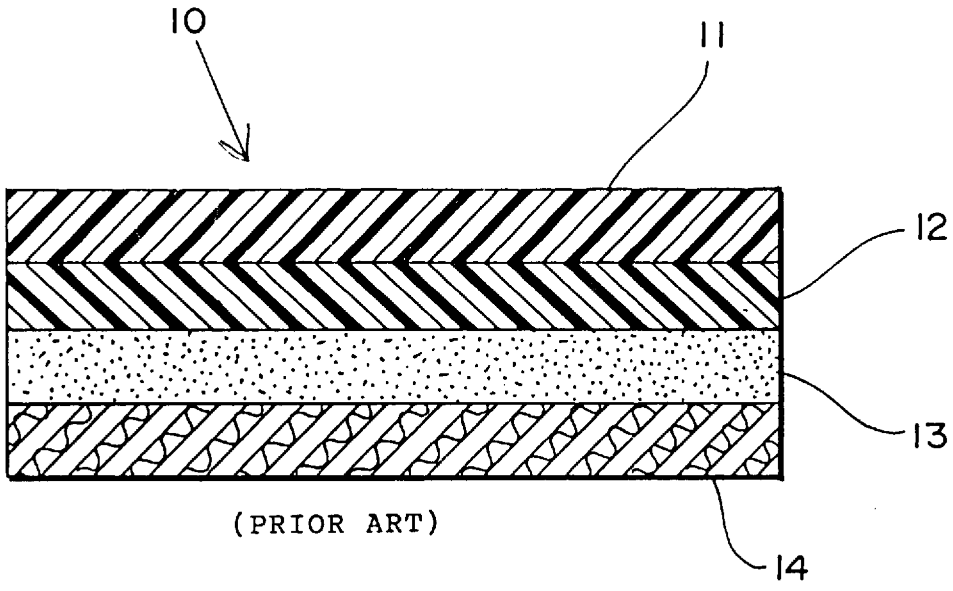

METHOD OF TRANSFERRING A GRAPHIC IMAGE FROM A TRANSFER HAVING A PAPER BACKING, A RELEASE LAYER, AND A DISCONTINUOUS LAYER

This is a continuation of U.S. application Ser. No. 08/406,549, filed Mar. 20, 1995, now abandoned.

FIELD OF THE INVENTION

The present invention relates to a graphic transfer and method. The field of the invention is that generally known as decalcomania transfers to the exclusion of silk screen transfers and others.

SUMMARY OF THE PRIOR ART

A borderless decorative graphic transfer secured to a substrate. It is normally transferred to a permanent substrate such as an automobile windshield, or any metallic item to be decorated, by wetting, and removing the decalcomania backing. The field is generally represented by U.S. Pat. No. 3,553,044. The art is classified in Class 428, subclass 914. Other examples of the prior art include U.S. Pat. Nos. 95,356; 145,606; 3,660,196; 4,028,474; and 4,529,654. The design involved in the subject patent disclosures is called a decal. The image is printed on a water slide paper. Such water slide paper usually includes an absorbent paper which is coated with a water soluble vegetable gum and starch release layer. The paper or backing serves as a support for the release layer and subsequent layers.

The image to be transferred is printed on the release layer with a wide variety of non-water soluble inks. The image can be applied by silk screening, offset printing, or toner based laser printout. Thereafter a continuous film of non-water soluble lacquer is applied over the entire image by silk screening or other methods known in the art which yield a relatively uniform coating. The coating is permitted to dry. After drying, the decal is relatively secure for stacking and shipping with one side being reinforced by the backing, and the other side being reinforced by a top coat.

In use, the decal as just described is soaked in water. After a few moments it will become apparent that the decal can be removed from the release layer. At this point the decal and "transfer" is moved as close as possible to the final location where the graphic is to be applied. Thereafter, the image is slidably removed from the support to its final location. The image must be moved very carefully on a cushion of water to its exact location. If air bubbles are trapped under the film, they should be removed by a squeegee or other rubbing action. Thereafter the image is permitted to dry.

Decals of the prior art are very delicate and difficult to handle. The coating leaves a visible layer, and usually a distinct border or edge spaced from the graphics. This type of decal is used in the ceramic industry, and the visible layer is burned off during the firing process. In the furniture industry, a nitro cellulose lacquer is applied to make the film. The transferred image and the substrate are then coated with a top coat or similar lacquer. This assimilates or dissolves the film. These methods of removing the film layer require special apparatus or the use of solvents. The film remains visible in most other applications. From an aesthetic standpoint, the visibility of the film is undesirable and so is the border.

In the illustrative drawings which accompany this application and will be described again below, FIG. 1 illustrates a traditional prior art decal. As will be seen, the reference numerals are as follows: Lacquer top coat forming a fill carrier for the image 11; graphic or design to be transferred 12; release layer 13; absorbent paper support 14.

There are numerous limitations and disadvantages with traditional decals. Firstly, the use of a kiln is not possible with large or flammable objects. In addition, traditional decals require solvents which can be toxic or flammable. Also the solvents can be damaging to various substrates. In the traditional decal the top coats assimilate the film. They normally require special equipment to apply and contain additional solvents. Large decals are virtually impossible to handle because they tear under their own weight. In addition, decals of the state of the art must be applied to absolutely smooth surface because any imperfections in the substrate will pierce the film coating and the damage will be visible on drying. Yet another disadvantage, and not the final one, is that vertical applications are extremely difficult. This follows because the image is floating on a cushion of water, and it can move under the effects of gravity before drying.

SUMMARY OF THE INVENTION

The present invention relates to a borderless decorative graphic transfer and its application which is applied to a gum and starch coated absorbent paper. The printed image may be done by non-soluble water, non-soluble ink or laser printer copy toner. After printing on the coated paper, an acrylic dusting is applied to the exterior. The overlay creates a non-continuous film graphic transfer with an invisible coating. Thereafter, the image can be transferred by heat, chemical, or contact adhesive. When it is transferred by heat, the dusted discontinuous coating absorbs in the image and when the paper is removed, the graphics are exposed. With the chemical release, the object is coated with an image transfer liquid. Thereafter the image is placed face down on the wet surface and slid into final position. After drying for approximately thirty minutes, the back of the transfer is wet—when it puckers it is peeled off. The third method involves chemical adhesive which transfers an image by rubbing. The graphic produced by the method just described is given two thin spray coatings of re-positional contact adhesive. The second is applied after the first is dry. The dry transfer is then reversed and placed in position. The back of the transfer is rubbed until the image transfers. Once the image transfers there is no border in the true sense of decals. The order is the border of the applied graphics.

In view of the foregoing, it is a principle object of the present invention to provide a graphic transfer and method which is relatively inexpensive, and produces a borderless decorative image with a fidelity that avoids detection as a decal transfer.

Another and important object of the present invention is to prepare a graphic transfer with a minimal use of toxic and environmentally undesirable chemicals.

Yet another object of the present invention is to provide a graphic transfer which can be transferred to a vertical surface. Related to this object, is the preparation of graphic transfers which can be applied to large vertical surfaces such as the sides of truck bodies, outdoor signs, and the like.

Yet an additional object of the present invention is to provide a graphic transfer which can be applied to a non-uniform smooth surface, and a curved surface, with the fidelity of reproduction remaining as complete as the image itself.

BRIEF DESCRIPTION OF THE ILLUSTRATIVE DRAWINGS

Figure 2:
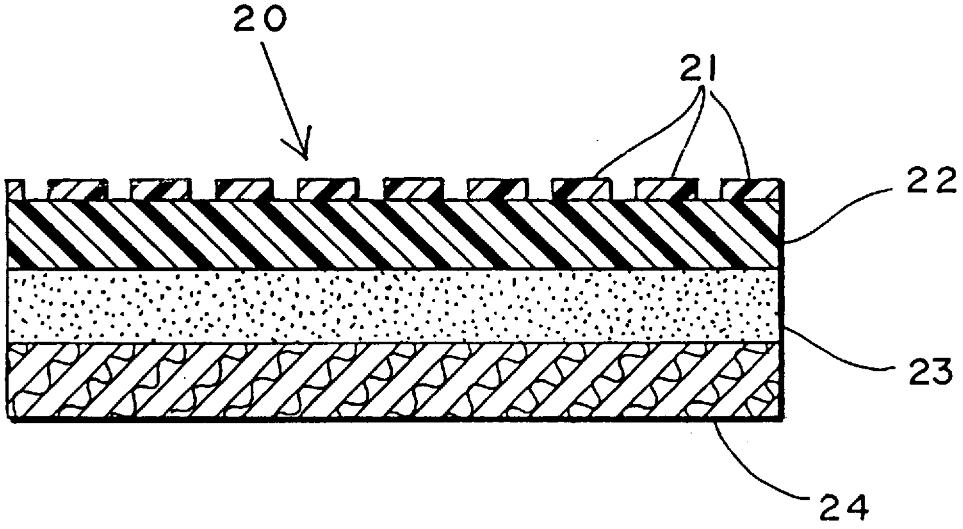

Further objects and advantages of the present invention will become apparent as the following description of an illustrative embodiment takes place, in which:

FIG. 1 is a transverse sectional view in diagrammatic form of a decal illustrative of the prior art; and FIG. 2 is a transverse sectional view comparable to that of FIG. 1 illustrative of the decal of the subject invention.

DESCRIPTION OF THE FIRST EMBODIMENT

Prior to describing the preferred embodiment, a review of the prior-art decal 10 as illustrated in FIG. 1 is appropriate. There it will be seen that there is a top coat 11 placed atop the printed image 12. A release layer 13 is applied to a backing 14 prior to the image 12 and the top coat 11.

With the graphic transfer 20 illustrative of the present invention, the absorbent paper 14 provides the bottom. A release layer 13 is applied to the absorbent paper prior to printing the graphics 22 on the release layer 23. The graphics 22 are applied by any printing device which is capable of using either non-water soluble ink or laser printer/copier toner. A Hewlett Packard color laser printer does an excellent job. Also the Cannon and Xerox colored imaging products work comparably to Hewlett Packard and reliably. Images have been transferred by silk screening using non-water soluble ink with the same level of success. Summarizing, the process works with most all printing devices that use non-water soluble ink or toner. Examples of such non-water soluble ink or toner are genuine Canon or Xerox toner.

The improved transfer is made by printing the image of the non-water soluble ink or toner to a gum and starched coated absorbent paper. Twincal and Photocal, both manufactured by Brittains T.R. Limited—Ivy House Paper Mills, Commercial Road, Hanley, Stakeon-Tret ST1 3QS, England work very well. Other gum coated decal papers have been successful in transferring images by the method of the present invention.

After printing by any of the above methods on any of the above papers a coating comprised of a modified acrylic lacquer, such as ML Campbells Clear Acrylic Lacquer, Part No. C 122-2 or Krylon Crystal Clear Acrylic Coating, product number 1301, is applied by spray. The coating is applied by dusting it on from approximately eighteen inches. If using an HVLP spray system, the air flow should be set on high and the material should be on a low volume setting. The coating is then applied by either method, by squeezing the trigger for approximately 0.05 seconds or less, creating a cloud of lacquer which settles on the surface in a semi-dry state. Immediately after spraying the paper should feel dry with a slightly gritty feeling. Over spraying will create a continuous film, traditional decal with a visible coating. If the coating is too wet, the air flow can be increased, the material volume can be decreased, or the duration of the spray can be reduced. This coating should cure for at least fifteen minutes before transferring the image.

The transfer is applied by HVLP or high volume low pressure type transferring. When over-spraying takes place, it cannot be repaired. Indeed, when over-spraying takes place it is tantamount to creating a decal-like transfer. The spray can be applied while the decal is in the horizontal orientation or it can also be applied if the decal is in a vertical orientation including while it is passing through a station on a continuous conveyor.

After the foregoing is concluded, the transfer will appear as shown in FIG. 2 where it will be seen that the absorbent paper 24 provides the backing. Atop the absorbent paper 24 is the release layer 23, to which the graphics with the non-water soluble ink or toner 2 have been applied. Finally, the non-continuous acrylic dusting coating 21 appears at the top. This non-continuous coating 21 is sufficiently durable to secure the decal 20 while sandwiched by the paper backing 24 for storage, shipment, and the like. To be particularly noted is the distinction drawn in the drawings between the discontinuous acrylic coating or dusting 21 of the applicant's invention, as contrasted with the continuous lacquer top coat 11 applied to the prior art decal 10.

Method of Application

Heat

The heat transfer method for the decal 20 is best used on a painted surface. The painted surface must be dry. The image is reversed and ironed on using an iron set at approximately 375° F. After ironing, the image and paper are welded to the painted surface using an iron. Thereafter it is allowed to cool. Once cooled, water is applied to the back of the paper backing 24. The paper then begins to pucker after a few minutes. At this time, a corner of the paper 24 is grasped and the backing 24 is removed to reveal a transferred image. The release layer partially dissolves facilitating a release. The discontinuous acrylic layer becomes the carrier for the transfer. Since it is not a continuous film, it appears to be invisible.

Chemical Transfer

The chemical method of transfer can be used on almost any surface that will accept an acrylic coating. The discontinuous acrylic coating 21 of the present invention is highly desirable. The surface of the object to which the transfer is to be made is coated with an image transfer liquid manufactured by Faux Effects, Inc. and sold as Faux Effects graphic transfer liquid. Another image transfer liquids which are acceptable include P&L acrylic index varnish flat.

The image is placed face down on the wet surface and slid into final position. Thereafter, the coating on the transfer surface is allowed to dry for approximately 20 minutes. At this time the back of the transfer 24 is wetted with either a sponge or a rag. When the paper backing 24 puckers, one corner is grasped and the backing 24 is removed to reveal the transferred graphic. The release layer 23, as with the heat transfer set forth above, partially dissolves facilitating the release. The discontinuous acrylic layer 21 becomes the carrier for the transfer. Since it is not a continuous film, it appears to be invisible. This method allows the assembly of very large decals. The paper backing 24 acts as a support which will not tear under its own weight. The coating is not continuous so that air bubbles do not become trapped under a continuous coating 11 as distinguished from the discontinuous acrylic dusting coating 21 of the present invention. In addition, the large transfers do not move under the effects of gravity. They are sufficiently light in weight that the transfer will support them in place.

Chemical Adhesive

The chemical adhesive permits the transfer of the graphic transfer 20 by rubbing. The graphic transfer 20 produced by the above method is given two thin spray coatings of re-positional contact adhesive. The coating is applied outside the discontinuous acrylic coating 21. The second coating is applied after the first one dries. 3M's repositional adhesive known as 3M remount repositional adhesive is highly acceptable. Also chromatic high teck concentrate made by Trans Art Suppliers of 196 Wicksteed Avenue, Toronto, Canada will work.

The coating is allowed to dry for at least 24 hours. Thereafter the dry transfer is reversed and placed in position. The back of the transfer is rubbed using 3 to 5 pounds of pressure applied by fingernail, the back of a wooden spoon, or any slightly resilient tool. Indeed, a throw away plastic putty knife will work. The pressure and the frequency of rubbing can be determined by gently lifting on a corner and determining whether the image is transferring. If it is, the backing is removed. If not, the rubbing is continued until a total transfer is achieved.

Most images transfer readily. A higher tack contact adhesive will cause an image to transfer more readily. Also the substrate must be smooth because any bumps will prevent a complete burnish. This dry method facilitates a transfer where liquids cannot be used or are undesirable. It is not always necessary to wet the backing. This is sometimes required, however, when obtaining a clean release of the backing is difficult.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A graphic transfer comprising:

a backing substrate formed of a gum and starch coated absorbent paper, an image printed on said paper utilizing a non-water soluble ink or laser printer copier toner, and an acrylic lacquer applied in a discontinuous gritty feeling coating over the image and dried.

2. A method of transferring a graphic image to a substrate, comprising the steps of:

applying a transfer having a paper backing and a release layer to the substrate, said release layer provided with a graphic image, said graphic image coated with a discontinuous acrylic outer coating;

ironing the transfer;

permitting the transfer to cool, after cooling, applying water to the paper backing;

after observing the paper backing of said transfer beginning to pucker, peeling the paper backing from the transferred image.

3. The method of transferring a graphic image as recited in claim 2, wherein said ironing step is performed with the iron set at a temperature of approximately 375° F.

4. A method of transferring a graphic image to a substrate comprising the steps of:

applying a transfer having a paper backing and a release layer to the substrate, said release layer provided with a graphic image, said graphic image coated with a discontinuous acrylic outer coating;

treating the substrate to which the image is to be transferred with an image transfer liquid;

placing the image face down on a wetted surface;

sliding the image into a final position;

permitting the coating to dry;

wetting the paper backing; and removing said paper backing from said image.

5. The method of transferring a graphic image as recited in claim 4, wherein said wetting step includes applying a wet sponge to the back of said paper backing.

6. The method of transferring a graphic image as recited in claim 4, wherein said wetting step includes applying a wet rag to the back of said paper backing.

7. The method of transferring a graphic image as recited in claim 4, wherein said treating step includes coating said substrate with Faux Effects (R) graphic transfer liquid.

8. The method of transferring a graphic image as recited in claim 4, wherein said treating step includes coating said substrate with P & L (R) acrylic index varnish flat.

9. A chemical method for transferring a graphic image to a substrate comprising the steps of:

applying a transfer having a paper backing and a release layer to the substrate, said release layer provided with a graphic image, said graphic image coated with a discontinuous acrylic outer coating;

applying a thin spray coating of re-positional contact adhesive over the discontinuous acrylic outer coating on the transfer;

placing the transfer in position;

rubbing the paper backing with pressures sufficient to commence transfer; and thereafter removing the backing.

10. The chemical method for transferring a graphic image as recited in claim 9, wherein said applying step includes a drying waiting period between said two thin spray coatings.

11. The chemical method for transferring a graphic image as recited in claim 9, wherein said repositional contact adhesive is 3M remount positional adhesive.

12. The chemical method for transferring a graphic image as recited in claim 9, wherein said repositional contact adhesive is chromatic high tack concentrate.

13. The chemical method for transferring a graphic image as recited in claim 9 wherein said rubbing step includes applying pressure to said paper backing using a putty knife.

* * * * *